US009935823B1

(12) United States Patent
Rosh et al.

(10) Patent No.: US 9,935,823 B1
(45) Date of Patent: Apr. 3, 2018

(54) CHANGE TO AVAILABILITY MAPPING

(71) Applicant: ServiceNow, Inc., Santa Clara, CA (US)

(72) Inventors: Haviv Rosh, Modiin (IL); Noam Biran, Kfar Menahem (IL)

(73) Assignee: ServiceNow, Inc., Santa Clara, CA (US)

( * ) Notice: Subject to any disclaimer, the term of this patent is extended or adjusted under 35 U.S.C. 154(b) by 130 days.

(21) Appl. No.: 15/166,453

(22) Filed: May 27, 2016

Related U.S. Application Data

(60) Provisional application No. 62/167,449, filed on May 28, 2015.

(51) Int. Cl.
*G06F 15/173* (2006.01)
*H04L 12/24* (2006.01)
*H04L 29/06* (2006.01)
*H04L 12/26* (2006.01)

(52) U.S. Cl.
CPC ...... *H04L 41/0803* (2013.01); *H04L 43/0817* (2013.01); *H04L 67/42* (2013.01)

(58) Field of Classification Search
None
See application file for complete search history.

(56) References Cited

U.S. PATENT DOCUMENTS

| 6,983,321 | B2 | 1/2006 | Trinon et al. |
| 8,065,263 | B1 | 11/2011 | Blazek et al. |
| 8,239,498 | B2 | 8/2012 | Kilpatrick et al. |
| 8,756,094 | B2 | 6/2014 | Keinan |
| 2006/0161444 | A1 | 7/2006 | Lubrecht et al. |
| 2008/0049630 | A1* | 2/2008 | Kozisek ............. H04L 41/0823 370/250 |
| 2008/0052394 | A1* | 2/2008 | Bugenhagen .......... H04L 12/14 709/224 |
| 2008/0117068 | A1* | 5/2008 | Sandstrom ............. H04L 41/06 340/635 |
| 2009/0254411 | A1 | 10/2009 | Bhattacharya et al. |
| 2011/0126047 | A1 | 5/2011 | Anderson et al. |
| 2011/0167024 | A1* | 7/2011 | Maldonado Diaz ... G06N 3/086 706/10 |
| 2011/0320228 | A1 | 12/2011 | Kowalski |
| 2012/0041858 | A1 | 2/2012 | Lewis |

* cited by examiner

*Primary Examiner* — Mohamed Ibrahim
(74) *Attorney, Agent, or Firm* — Fletcher Yoder PC

(57) ABSTRACT

A computerized system performs monitoring and analysis of a communications network. The system displays predefined status indicators for each resource of the network, such as hardware and services. The system receives notification of planned maintenance operations involving resources in the network. The system analyzes the resources of the communications network to identify resources with at least some functional impairment. For each impaired resource, the system applies a predetermined impact analysis framework to determine whether the impairment is causally related to any of the planned maintenance operations. The system updates the predefined status indicator of each functionally impaired resource. Updates to status indicators are suspended, however, for those resources whose functional impairment is causally related to any of the planned maintenance operations.

20 Claims, 9 Drawing Sheets

CHANGE TO AVAILABILITY MAPPING

CROSS REFERENCE TO RELATED APPLICATIONS

The present application claims the benefit of U.S. Provisional Application No. 62/167,449, filed May 28, 2015, entitled, "Change to Availability Mapping", herein incorporated by reference.

TECHNICAL FIELD

The present disclosure relates in general to techniques and system for providing a status output for resources in a communications network, and more particularly, for conditioning updates to status indicators to account for known system maintenance operations.

BACKGROUND

The importance of computing and storing data is widely recognized today, and so is the importance of efficiently exchanging data. For this reason, communications networks are ubiquitous in corporate, government, educational institutions, and public institutions.

It is important to properly maintain a communications network to ensure that the network operates at full capacity and without interruption. In this regard, there are various computing tools that enable system administrators to initiate, carry out, and monitor a variety of network maintenance functions.

Beyond maintenance, another important function in computer networking is the act of monitoring the health and status of a network. Monitoring tools can help ensure that repairs are conducted promptly by drawing the attention of system administrators and automated remediation programs. Monitoring tools also perform other useful functions, such as helping system administrators to reallocate resources, notify users, and make system configuration decisions.

SUMMARY

Disclosed herein are implementations of a computer-driven system and process to monitor and analyze a communications network. In an implementation, a computer-driven process displays predefined status indicators for each resource of the network, such as hardware and services. The process receives notification of planned maintenance operations involving resources in the network. The process repeatedly analyzes the resources of the communications network to identify resources with at least some functional impairment. For each impaired resource, the process applies a predetermined impact analysis framework to determine whether the impairment is causally related to any of the planned maintenance operations. The process updates the predefined status indicator of each functionally impaired resource. Updates to status indicators are suspended, however, for those resources whose functional impairment is causally related to any of the planned maintenance operations.

In an implementation, a computer-implemented network diagnostics system, comprises a communications network, network accessible storage comprising a network interface and a non-volatile storage medium, a web server coupled to the communications network, the web server comprising a processor that is programmed to relay selected information for display by client computers coupled to the network, and a system management module, coupled to the communications network and the network accessible storage via a network interface of the system management module, the system management module comprising a digital data processor, program storage coupled to the digital data processor, and one or more network links coupled to the digital data processor to relay data between the digital data processor and the communications network, wherein the digital data processor is programmed to perform computer-implemented impact analysis tasks according to machine-readable instructions contained in the program storage that: direct the web server to provide for display at one of the client computers an output comprising a predefined status indicator for each of a plurality of client resources of the communications network, each status indicator representing a functional state of a corresponding item of the client resources, wherein the client resources comprise hardware components of the communications network and services provided by said hardware components, receive, from one or more of the plurality of client resources of the communications network, notification of one or more planned maintenance operations defined for specific items of the client resources, analyze a state of the resources of the communications network to identify resources experiencing complete or partial functional impairment, direct the web server to provide for display at one or more client computers an output comprising an update to the predefined status indicator of each of the functionally impaired resources, perform, for each resource experiencing complete or partial functional impairment, tasks that apply a predetermined impact analysis framework to determine whether the functional impairment is causally related to the planned maintenance operations, causing the direct of the web server to modify or suspend updating of the predefined status indicators of the resources whose functional impairment is causally related to the planned maintenance operations.

In an implementation, a computer-implemented network diagnostics process for use in a communications network that comprises network accessible storage, a web server coupled to the communications network, the web server programmed to relay selected information for display by client computers coupled to the network, and a data monitoring and analysis machine, coupled to the communications network and the network accessible storage and comprising at least one digital data processor, program storage coupled to the digital data processor, and one or more network links coupled to the digital data processor to relay data between the digital data processor and the communications network, the process comprising tasks performed by the digital data processor executing machine readable instructions stored in the program storage and comprises directing the web server to provide for display at one of the client computers an output comprising a predefined status indicator for each of a plurality of client resources of the communications network, each status indicator representing a functional state of a corresponding item of the client resources, wherein the client resources comprise hardware components of the communications network and services provided by said hardware components, receiving, from one or more client computers coupled to the communications network, notification of planned maintenance operations defined for specific items of the client resources, analyzing a state of the resources of the communications network including identifying resources experiencing complete or partial functional impairment, directing the web server to provide for display at one or more client computers an output comprising an update to the predefined status indicator of each of the functionally impaired resources, performing, for each resource experiencing complete or partial functional impairment, tasks comprising applying a predetermined impact analysis framework to determine whether the functional impairment is causally related or causally unrelated to any of planned maintenance operations, causing the directing task to suspend updating of the predefined status indicators of any of the resources whose functional impairment is causally related to the planned maintenance operations.

In an implementation, a computer-readable media has stored thereon machine-readable instructions executable by one or more digital data processing machines to perform the operations described above; or first machine-readable instructions executable by one or more digital data processing machines to install second machine-readable instructions executable by one or more digital data processing machines to perform the operations described above.

BRIEF DESCRIPTION OF THE DRAWINGS

The description herein makes reference to the accompanying drawings, where like reference numerals refer to like parts throughout the several views, and where.

DETAILED DESCRIPTION

Figure 1:
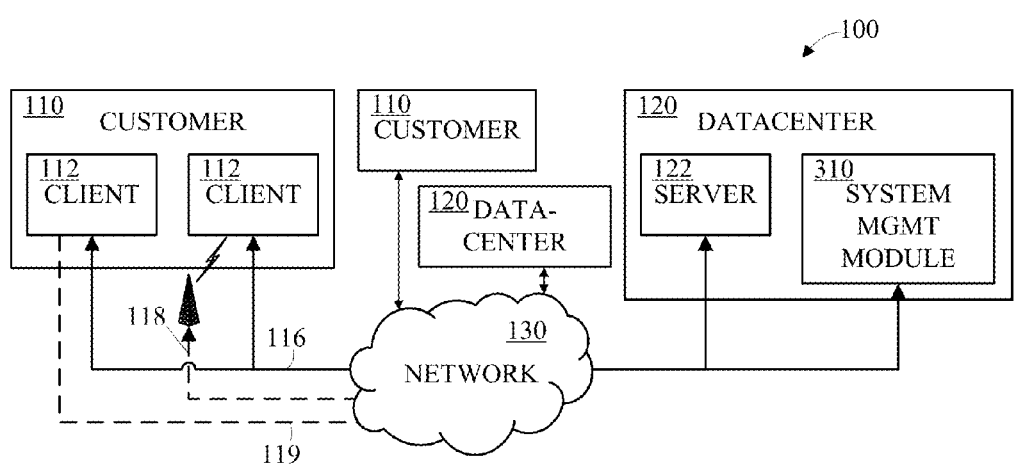
FIG. 1 is a block diagram of an example computer network/cloud computing system.

Despite the many benefits of known network monitoring tools, there is still significant room for improvement. One potential shortcoming concerns interplay between the network monitoring and maintenance functions. As one example, planned configuration changes can cause some challenges for network monitoring systems.

One implementation of this disclosure concerns a computer-driven system programmed to perform certain monitoring and analysis of a communications network. The network contains various hardware corresponding to one or more clients. For ease of explanation, a single-client arrangement is used as an example throughout this disclosure. Resources are comprised of client hardware in the network as well as services provided, supported, or driven by the hardware.

Some examples of hardware resources include a switch, router, server, modem, processor, I/O interface, memory, power supply, biometric reader, media reader, and the like. Some examples of services include software and firmware processes, including high level business services, executed by the hardware resources. Resources may also include computing features such as documents, models, plans, sockets, virtual machines, etc. In a further embodiment, resources may also include documents, databases, data structures, files, etc.

A system management module is provided to monitor and analyze resources in the network. The system management module uses a web server to provide an output available to client/user computers connected to the network. The output includes a predefined status indicator for each client resource of the communications network. Each status indicator represents a functional state of a corresponding item of client resources. In one specific application, the network resources are illustrated as nodes in a block diagram.

The system management module receives notification of planned maintenance operations involving resources in the network. For example, there might be plans to take a server off-line for a period of time or reduce the bandwidth or capacity of certain storage. Some notifications may be user-submitted, while others may come from machine reporting or automated discovery.

Apart from the planned maintenance operations, the system management module analyzes network resources to identify those resources with complete or partial functional impairment. This may be performed, for example, by studying events reported by various components in the system, gathering information about network resources, and/or by querying resources directly.

For each impaired resource, the system management module applies a predetermined impact analysis framework to determine whether the impairment is causally related to any of the planned maintenance operations. For example, if a server is down but the system has received notification of a planned maintenance operation including taking that server down, then there is a causal relationship. The impact analysis framework may use root cause analysis, aggregation of events, machine learning, historical analysis, another approach, or a combination of these.

The system management module updates the output by adding one or more predefined alerts for each functionally impaired resource. In one specific application, alerts are expressed as icons attached to the displayed nodes. The system management module also updates the status indicators of each resource experiencing functional impairment. For example, a status indicator may be changed from green to yellow or red. The system management module selectively suspends or cancels some of the status indicator updates, however. Namely, updates are suspended or canceled for those resources whose functional impairment is causally related to any of the planned maintenance operations.

The aforementioned functionality provides a way to understand the impact of a change and to be able to take into account changes on services impact analysis and status calculation. This also provides a foundation for making recommendations based on historical data and calculating and/or foreseeing the impact of the change on other components and services.

To describe some implementations in greater detail, reference is made to some example hardware structures and interconnections.

FIG. 1 is a block diagram of a distributed (e.g., client-server, networked, or cloud) computing system 100. Use of the phrase "cloud computing system" herein is a proxy for any form of a distributed computing system, and this phrase is used simply for ease of reference. Cloud computing system 100 can have any number of customers, including customer 110. Each customer 110 may have clients, such as clients 112. Each of clients 112 can be in the form of a computing system including multiple computing devices, or in the form of a single computing device, for example, a mobile phone, a tablet computer, a laptop computer, a notebook computer, a desktop computer, and the like. Customer 110 and clients 112 are examples only, and a cloud computing system may have a different number of customers or clients or may have a different configuration of customers or clients. For example, there may be hundreds or thousands of customers and each customer may have any number of clients. Customers and clients may be described more generally as respective user entities/groups and end users.

Cloud computing system 100 can include any number of datacenters, including datacenter 120. Each datacenter 120 may have servers, such as servers 122. Each datacenter 120 may represent a facility in a different geographic location where servers are located. Each of servers 122 can be in the form of a computing system including multiple computing devices, or in the form of a single computing device, for example, a desktop computer, a server computer and the like. The datacenter 120 and servers 122 are examples only, and a cloud computing system may have a different number of datacenters and servers or may have a different configuration of datacenters and servers. For example, there may be tens of data centers and each data center may have hundreds or any number of servers.

Clients 112 and servers 122 may be configured to connect to network 130. The clients for a particular customer may connect to network 130 via a common connection point 116 or different connection points, e.g. a wireless connection point 118 and a wired connection point 119. Any combination of common or different connections points may be present, and any combination of wired and wireless connection points may be present as well. Network 130 can be, for example, the Internet. Network 130 can also be or include a local area network (LAN), wide area network (WAN), virtual private network (VPN), or any other means of transferring data between any of clients 112 and servers 122. Network 130, datacenter 120 and/or blocks not shown may include network hardware such as routers, switches, load balancers and/or other network devices.

Other implementations of the cloud computing system 100 are also possible. For example, devices other than the clients and servers shown may be included in system 100. In an implementation, one or more additional servers may operate as a cloud infrastructure control, from which servers and/or clients of the cloud infrastructure are monitored, controlled and/or configured. For example, some or all of the techniques described herein may operate on said cloud infrastructure control servers. Alternatively, or in addition, some or all of the techniques described herein may operate on servers such as servers 122. FIG. 1 also illustrates a system management module 310 (that may incorporate a server 122) that is discussed in more detail below.

Cloud computing may provide various advantages over traditional computing models, including the ability to allocate shared resources amongst many different customers. Under traditional computing models, computing resources are typically allocated to a single customer or entity and substantial portions of those resources may remain unused or underused.

Computing resources of cloud computing infrastructure may be allocated, for example, using a multi-tenant or a single-tenant architecture. Under a multi-tenant architecture, installations or instantiations of application, database, and/or other software application servers may be shared among multiple customers. For example, a single web server (such as a unitary Apache installation), application server (such as a unitary Java Virtual Machine) and/or a single database server catalog (such as a unitary MySQL catalog) may handle requests from multiple customers. In a multi-tenant architecture, data or applications used by various customers may be commingled or shared. In an implementation of this architecture, the application and/or database server software may distinguish between and segregate data and other information of the various customers using the system. For example, database records belonging to a particular customer may be identified using a customer_id field in a database table holding records for numerous customers.

Under a single-tenant infrastructure, separate web servers, application servers, and/or database servers are created for each customer. In other words, each customer will access its dedicated web server(s), will have its transactions processed using its dedicated application server(s), and will have its data stored in its dedicated database server(s) and or catalog (s). In a single-tenant architecture, physical hardware servers may be shared such that multiple installations or instantiations of web, application, and/or database servers may be installed on the same physical server. Each installation may be allocated a certain portion of the physical server resources, such as RAM, storage, and CPU cycles.

In an example implementation, a customer instance is composed of multiple web server instances, multiple application server instances, and multiple database server instances. Each of these server instances may be located on different physical servers and each of these server instances may share resources of the different physical servers with a number of other server instances associated with other customer instances. In a given cloud infrastructure system, different implementations of customer instances may be used for different customer instances at the same time. Other configurations and implementations of customer instances may also be used. The web, application, and database servers of the customer instance may be allocated to different datacenters to facilitate high availability of the applications and data provided by the servers. There may be a primary pair of web servers and application servers in a first datacenter and a backup pair of web servers and application servers in a second datacenter. There may be a primary database server in the first datacenter and a second database server in the second datacenter. The primary database server may replicate data to the secondary database server. The cloud computing infrastructure may be configured to direct traffic to the primary pair of web servers which may be configured to utilize the primary pair of application servers and primary database server respectively. In a failure scenario, the secondary servers may be converted to primary servers.

The application servers may include a platform application, such as one written in Java, for example, that provides generic platform functionality for accessing the database servers, integrating with external applications, and rendering web pages and other content to be transmitted to clients. The generic platform functionality may be configured with metadata stored in the database server. In other words, the operation of the platform on the application server may be customized by certain end-users of the platform without requiring the Java code of the platform application to be changed. The database server instances may be configured with a database configuration and schema to facilitate the operation of the platform. For example, the database server instance may be configured with various tables for storing metadata about applications, tables/fields, menus, forms, business rules, scripts, and custom user interface elements that are used to customize the appearance and operation of the customer instance. In some implementations, the application servers may include web server functionality and the web servers may be omitted.

Figure 2:
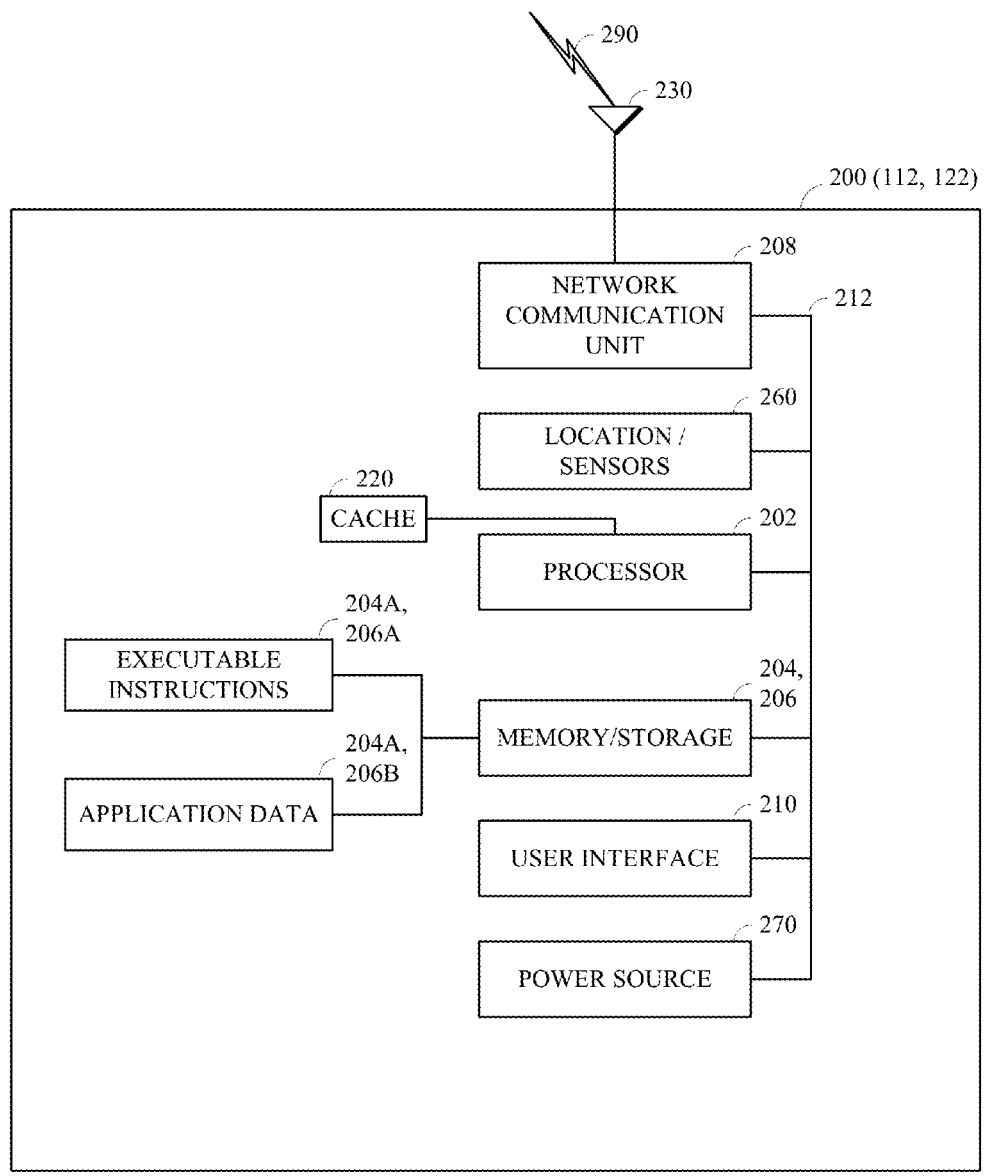
FIG. 2 is a block diagram of an example computer.

FIG. 2 is a block diagram of an example internal configuration of a computing device 200, such as a client 112 or server device 122 of the computing system 100 as shown in FIG. 1, including an infrastructure control server, of a computing system. As previously described, clients 112 or servers 122 may take the form of a computing system including multiple computing units, or in the form of a single computing unit, for example, a mobile phone, a tablet computer, a laptop computer, a notebook computer, a desktop computer, a server computer and the like.

The computing device 200 can include a number of components, as illustrated in FIG. 2. CPU (or processor) 202 can be a central processing unit, such as a microprocessor, and can include single or multiple processors, each having single or multiple processing cores. Alternatively, CPU 202 can include another type of device, or multiple devices, capable of manipulating or processing information now-existing or hereafter developed. When multiple processing devices are present, they may be interconnected in any manner, including hardwired or networked, including wirelessly networked. Thus, the operations of CPU 202 can be distributed across multiple machines that can be coupled directly or across a local area or other network The CPU 202 can be a general purpose processor or a special purpose processor.

Random Access Memory (RAM 204) can be any suitable non-permanent storage device that is used as memory. RAM 204 can include executable instructions and data for immediate access by CPU 202. RAM 204 typically comprises one or more DRAM modules such as DDR SDRAM. Alternatively, RAM 204 can include another type of device, or multiple devices, capable of storing data for processing by CPU 202 now-existing or hereafter developed. CPU 202 can access and manipulate data in RAM 204 via bus 212. The CPU 202 may utilize a cache 220 as a form of localized fast memory for operating on data and instructions.

Storage 206 can be in the form of read only memory (ROM), a disk drive, a solid state drive, flash memory, Phase-Change Memory (PCM), or any form of non-volatile memory designed to maintain data for some duration of time, and preferably in the event of a power loss. Storage 206 can include executable instructions 206A and application files/data 206B along with other data. The executable instructions 206A can include, for example, an operating system and one or more application programs for loading in whole or part into RAM 204 (with RAM-based executable instructions 204A and application files/data 204B) and to be executed by CPU 202. The executable instructions 206A may be organized into programmable modules or algorithms, functional programs, codes, and code segments designed to perform various functions described herein.

The term module, as used herein, can be implemented using hardware, software, or a combination thereof. A module may form a part of a larger entity, and may itself be broken into sub-entities. When a module is implemented using software, this software can be implemented as algorithmic components comprising program instructions stored in a memory, the instructions designed to be executed on a processor. The term "module" does not require any specific form of coding structure, and functional implementations of different modules may be independent but also may overlap and be performed by common program instructions. For example, a first module and a second module may be implemented using a common set of program instructions without distinct boundaries between the respective and/or common instructions that implement the first and second modules.

The operating system can be, for example, a Microsoft Windows®, Mac OS X®, or Linux®, or operating system, or can be an operating system for a small device, such as a smart phone or tablet device, or a large device, such as a mainframe computer. The application program can include, for example, a web browser, web server and/or database server. Application files 206B can, for example, include user files, database catalogs and configuration information. In an implementation, storage 206 includes instructions to perform the discovery techniques described herein. Storage 206 may comprise one or multiple devices and may utilize one or more types of storage, such as solid state or magnetic.

The computing device 200 can also include one or more input/output devices, such as a network communication unit 208 and interface 230 that may have a wired communication component or a wireless communications component 290, which can be coupled to CPU 202 via bus 212. The network communication unit 208 can utilized any of a variety of standardized network protocols, such as Ethernet, TCP/IP, to name a few of many protocols, to effect communications between devices. The interface 230 can comprise one or more transceiver(s) that utilize the Ethernet, power line communication (PLC), WiFi, infrared, GPRS/GSM, CDMA, etc.

A user interface 210 can include a display, positional input device (such as a mouse, touchpad, touchscreen, or the like), keyboard, or other forms of user input and output devices. The user interface 210 can be coupled to the processor 202 via the bus 212. A graphical user interface (GUI) 210 is specifically a user interface that allows people to interact with a device in a graphical. It can be broken down into an input portion, an output portion, and a processor that manages, process, and interacts with the input and output portions. The input portion can accept input created by elements such as a mouse, touchpad, touchscreen, or the like. The output portion of a GUI can generate input displayable on some form of a display, such as a cathode-ray tube (CRT), liquid crystal display (LCD), and light emitting diode (LED) display, such as an organic light emitting diode (OLED) display. The display is generally formed of a grid of pixels, each of which can take on various illumination and optionally color values that are grouped together and arranged to form various higher-level entities (in pixel regions) on the display. These pixel regions can make up icons, windows, buttons, cursors, control elements, text, and other displayable entities. The display utilizes graphical device interface that typically comprises a graphics processor specifically designed to interact with the hardware of the display, and may accept high-level instructions from other processors to reduce demands on them. The graphical device interface typically has its own memory that serves as a buffer and also allows manipulation of stored data by the graphics processor. Operation of the display thus typically involves the graphics processor accessing instructions and data stored memory to modify pixel regions on the display for the user.

Other implementations of the internal configuration or architecture of clients and servers 200 are also possible. For example, servers may omit display 210. RAM 204 or storage 206 can be distributed across multiple machines such as network-based memory or memory in multiple machines performing the operations of clients or servers. Although depicted here as a single bus, bus 212 can be composed of multiple buses, that may be connected to each other through various bridges, controllers, and/or adapters. Computing devices 200 may contain any number of sensors and detectors that monitor the device 200 itself or the environment around the device 200, or it may contain a location identification unit 260, such as a GPS or other type of location device. The computing device 200 may also contain a power source 270, such as a battery, so that the unit can operate in a self-contained manner. These may communicate with the CPU/processor 202 via the bus 212.

Figure 3:
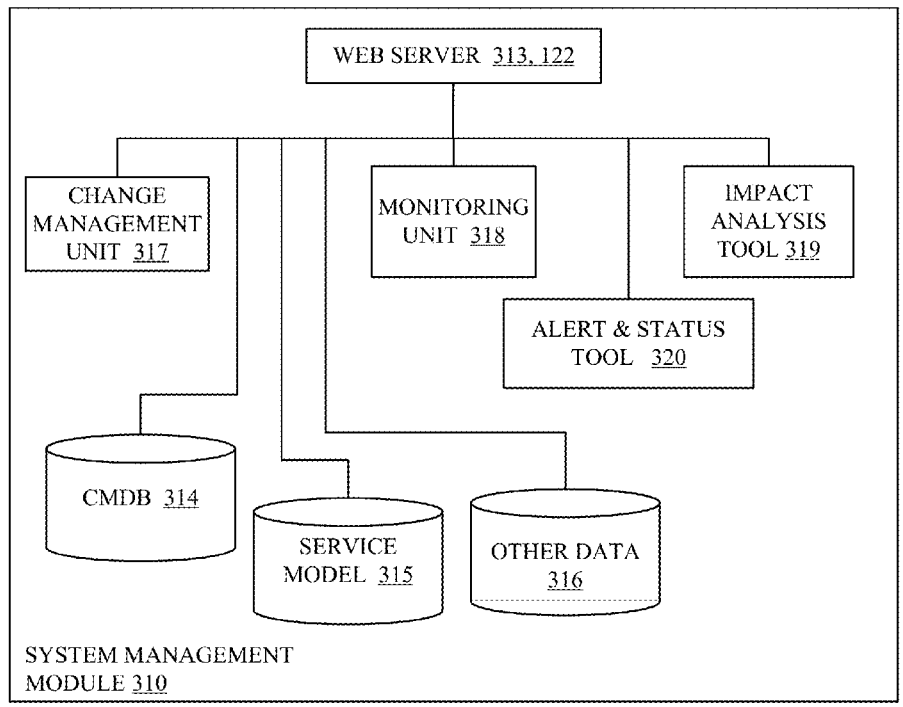
FIG. 3 is a block diagram of an example system management module.

The system 100 also includes a system management module 310. FIG. 3 is a block diagram of an example system management module. The module 310, which may be implemented as one or multiple machines, includes a web server 313, which may be a specific type of the system servers 122, programmed to relay selected information for display by client/user computers 112. One function of the web server 313 is therefore to assemble, collect, convert, format, and otherwise prepare output from other components of the system management module 310 for display to various networked clients via the network 130. In a different embodiment, the web server 313 may be considered to be outside the system management module 310.

In one implementation, resources in the network are represented by nodes in a configuration management database (CMDB) 314 (which may be located in the storage 204, 206) and more particularly, configuration items (CIs) stored in the CMDB 314, which are data records with data related to the components making up the system 100. Each CI includes one or more relationships with one or more other CIs. Some of these relationships may include a dependency relationship. The collection of CIs and relationships constitute a service model 315 which may be located in the storage 204, 206. Depending upon the implementation, the service model may be, but need not be, one-in-the same as the CMDB 314. The CMDB 314 may be populated by client submissions including web service imports, direct database imports, and spreadsheet file imports. CMDB population may also occur via automated discovery and other methods conducted by the module 310. For example, with auto discovery, a discovery tool (not shown) of the module 310 identifies CIs and launches additional probes and sensors to gather further information and attributes about an identified CI and/or other CIs. In one implementation, auto discovery can be performed in a top-down fashion. When discovery is performed top-down, an entry point is first specified indicating how a business service is consumed (e.g., via a web service). The entry point is analyzed to identify one or more CIs (e.g., entities or nodes in the network) to which various probes can be sent to obtain additional information. These probes can be configured to identify other CIs related to the initially discovered CIs and associated relationships between the CIs. This process can be performed iteratively until no more CIs or relationships are discovered. The discovery tool may further check such data for errors, normalize and transform the data, and load the data to ensure the most recent and accurate profile of that CI.

The module 310 also includes client interface tools (not shown) that are operable with the web server 313 to provide graphical views of complex information technology (IT) infrastructure and service relationships to client computers on the system 100. These client interface tools provide output by which IT professionals can click through data maps, filter data, focus in on specific CIs, and view impact and risk alongside in-flight operational activities such as incident, problem, and change requests. The client interface tools further provide a simple and flexible reporting engine, which provides an output including dashboards and reports, which may be scheduled to be distributed on a regular basis. The client interface tools provide administrators, system owners, and service owners with data to quickly identify configuration drift, unplanned changes, and incident history to understand the health of CIs they are responsible for and the operational activities directly or indirectly impacting those CIs.

The module 310 also includes a change management unit 317 operable with the web server 313 to provide a graphical user interface (GUI) to receive data representing client-submitted changes to network configuration and topology. The unit 317 is also configured to receive client-submitted notification of planned maintenance operations affecting the system 100. The unit 317 may store records of planned maintenance operations in storage 315.

The module 310 also includes a monitoring unit 318 which, as described in greater detail below, monitors the system 100 to identify any functionally impaired resources. An alert and status tool 320 provides outputs of various notification corresponding to functionally impaired CIs. An impact analysis tool 319 analyzes the relationship, if any, between functional impairments and planned maintenance operations. The components 317-320 may store records of functional impairment and causal relationship as well as records of any other relevant data that is found, prepared, computed, or received by the components 317-320. Storage 316 may be used to store such data, for example.

Responsive to receiving advance notification of newly planned maintenance, the tool 319 may provide further services of consulting historical records from storage 316 and formulating predictions as to future functional impairment likely to occur as a consequence of the newly planned maintenance. In addition to the components 317-320, the system management module 310 may provide various other tools or functional modules (not shown).

In one implementation, the system 100 may be applied to the task of cloud computing. Cloud computing may provide various advantages over traditional computing models, including the ability to allocate shared resources amongst many different customers. Under traditional computing models, computing resources are typically allocated to a single customer or entity and substantial portions of those resources may remain unused or underused.

Computing resources of cloud computing infrastructure may be allocated, for example, using a multi-tenant or a single-tenant architecture. Under a multi-tenant architecture, installations or instantiations of application, database, and/or other software application servers may be shared among multiple customers. For example, a single web server (such as a unitary Apache installation), application server (such as a unitary Java Virtual Machine) and/or a single database server catalog (such as a unitary MySQL catalog) may handle requests from multiple customers. In a multi-tenant architecture, data or applications used by various customers may be commingled or shared. In an implementation of this architecture, the application and/or database server software may distinguish between and segregate data and other information of the various customers using the system. For example, database records belonging to a particular customer may be identified using a customer_id field in a database table holding records for numerous customers.

Under a single-tenant infrastructure, separate web servers, application servers, and/or database servers are created for each customer. In other words, each customer will access its dedicated web server(s), will have its transactions processed using its dedicated application server(s), and will have its data stored in its dedicated database server(s) and or catalog (s). In a single-tenant architecture, physical hardware servers may be shared such that multiple installations or instantiations of web, application, and/or database servers may be installed on the same physical server. Each installation may be allocated a certain portion of the physical server resources, such as RAM, storage, and CPU cycles.

In an exemplary implementation, a customer instance is composed of multiple web server instances, multiple application server instances, and multiple database server instances. Each of these server instances may be located on different physical servers and each of these server instances may share resources of the different physical servers with a number of other server instances associated with other customer instances. In a given cloud infrastructure system, different implementations of customer instances may be used for different customer instances at the same time. Other configurations and implementations of customer instances may also be used. The web, application, and database servers of the customer instance may be allocated to different datacenters to facilitate high availability of the applications and data provided by the servers. There may be a primary pair of web servers and application servers in a first datacenter and a backup pair of web servers and application servers in a second datacenter. There may be a primary database server in the first datacenter and a second database server in the second datacenter. The primary database server may replicate data to the secondary database server. The cloud computing infrastructure may be configured to direct traffic to the primary pair of web servers which may be configured to utilize the primary pair of application servers and primary database server respectively. In a failure scenario, the secondary servers may be converted to primary servers.

The application servers may include a platform application, such as one written in Java, for example, that provides generic platform functionality for accessing the database servers, integrating with external applications, and rendering web pages and other content to be transmitted to clients. The generic platform functionality may be configured with metadata stored in the database server. In other words, the operation of the platform on the application server may be customized by certain end-users of the platform without requiring the Java code of the platform application to be changed. The database server instances may be configured with a database configuration and schema to facilitate the operation of the platform. For example, the database server instance may be configured with various tables for storing metadata about applications, tables/fields, menus, forms, business rules, scripts, and custom user interface elements that are used to customize the appearance and operation of the customer instance. In some implementations, the application servers may include web server functionality and the web servers may be omitted.

Figure 4:
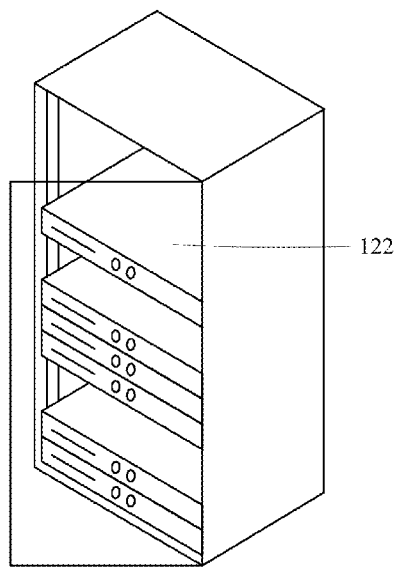
FIG. 4 is a perspective view diagram of an example storage enclosure for housing computing equipment.

FIG. 4 is a perspective view diagram of an example storage enclosure for housing computing equipment. One implementation of this structure includes a computer hardware rack other storage enclosure, frame, or mounting that houses rack mounted servers 122. In this example, the computer servers 122 include their own power supplies and network connections. Another implementation includes a blade enclosure containing blade servers. The blade enclosure includes power supplies, cooling units, and networking components shared by the constituent blade servers. A control center (not shown) may be provided to supervise and collectively manage operations of the racked computer servers.

Figure 5A:
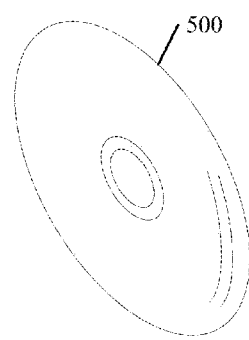
FIG. 5A is a pictorial perspective view of an example storage medium.

In any case, the storage media may be implemented by nearly any mechanism to digitally store machine-readable signals. One example is optical storage such as CD-ROM, WORM, DVD, digital optical tape, disk storage 500 (FIG. 5A), or other optical storage. Another example is direct access storage, such as a conventional "hard drive", redundant array of inexpensive disks (RAID), or another direct access storage device (DASD). Another example is serial-access storage such as magnetic or optical tape. Still other examples of digital data storage include electronic memory such as ROM, EPROM, flash PROM, EEPROM, memory registers, battery backed-up RAM, etc.

An example storage medium is coupled to a processor so the processor may read information from, and write information to, the storage medium. In the alternative, the storage medium may be integral to the processor. In another example, the processor and the storage medium may reside in an ASIC or other integrated circuit.

Figure 5B:
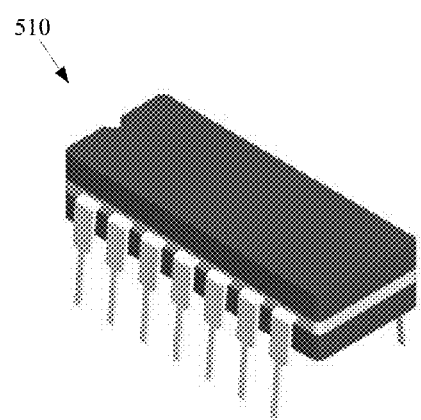
FIG. 5B is a pictorial perspective view of an example logic circuit.
Figure 5C:
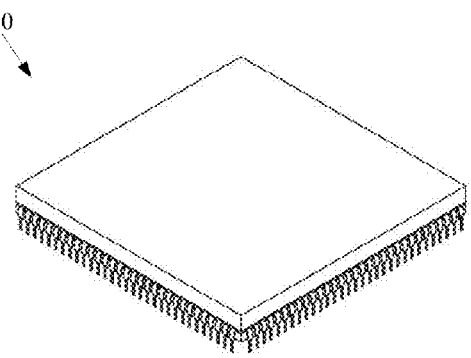
FIG. 5C is a pictorial perspective view of another example logic circuit.

In contrast to storage media that contain machine-executable instructions, as described above, a different embodiment uses logic circuitry to implement some or all of the processing features described herein. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS, TTL, VLSI, or another suitable construction. Other alternatives include a digital signal processing chip (DSP), discrete circuitry (such as resistors, capacitors, diodes, inductors, transistors, and the like), field programmable gate array (FPGA), programmable logic array (PLA), programmable logic device (PLD), and the like. FIG. 5B shows an example of logic circuitry at 510. FIG. 5C shows a different example of logic circuitry at 520.

More particularly, one or more clients or servers or other machines described herein may include an ASIC or programmable logic array such as a FPGA configured as a special-purpose processor to perform one or more of the operations or operations described or claimed herein. An example FPGA may include a collection of logic blocks and RAM blocks that may be individually configured and/or configurably interconnected in order to cause the FPGA to perform certain functions. Certain FPGAs may contain other general or special purpose blocks as well. An example FPGA may be programmed based on a hardware definition language (HDL) design, such as VHSIC Hardware Description Language or Verilog.

Having described the structural features of the present disclosure, some operational implementations of the disclosure will now be described. The operations of any method, process, or algorithm described in connection with the embodiments disclosed herein may be embodied directly in hardware, firmware, software executed by hardware, circuitry, or a combination of these.

Figure 9:
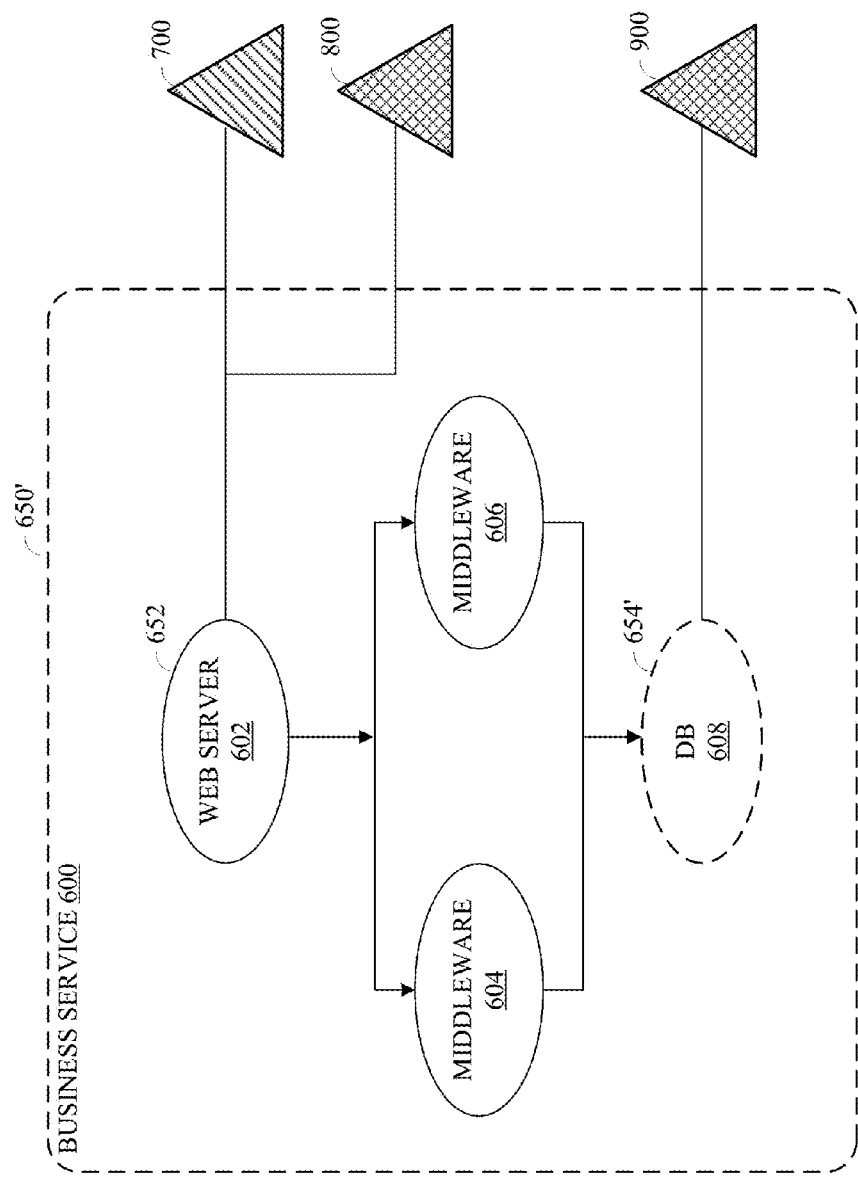
FIG. 9 is an example screen display of an illustrative output.
Figure 10:
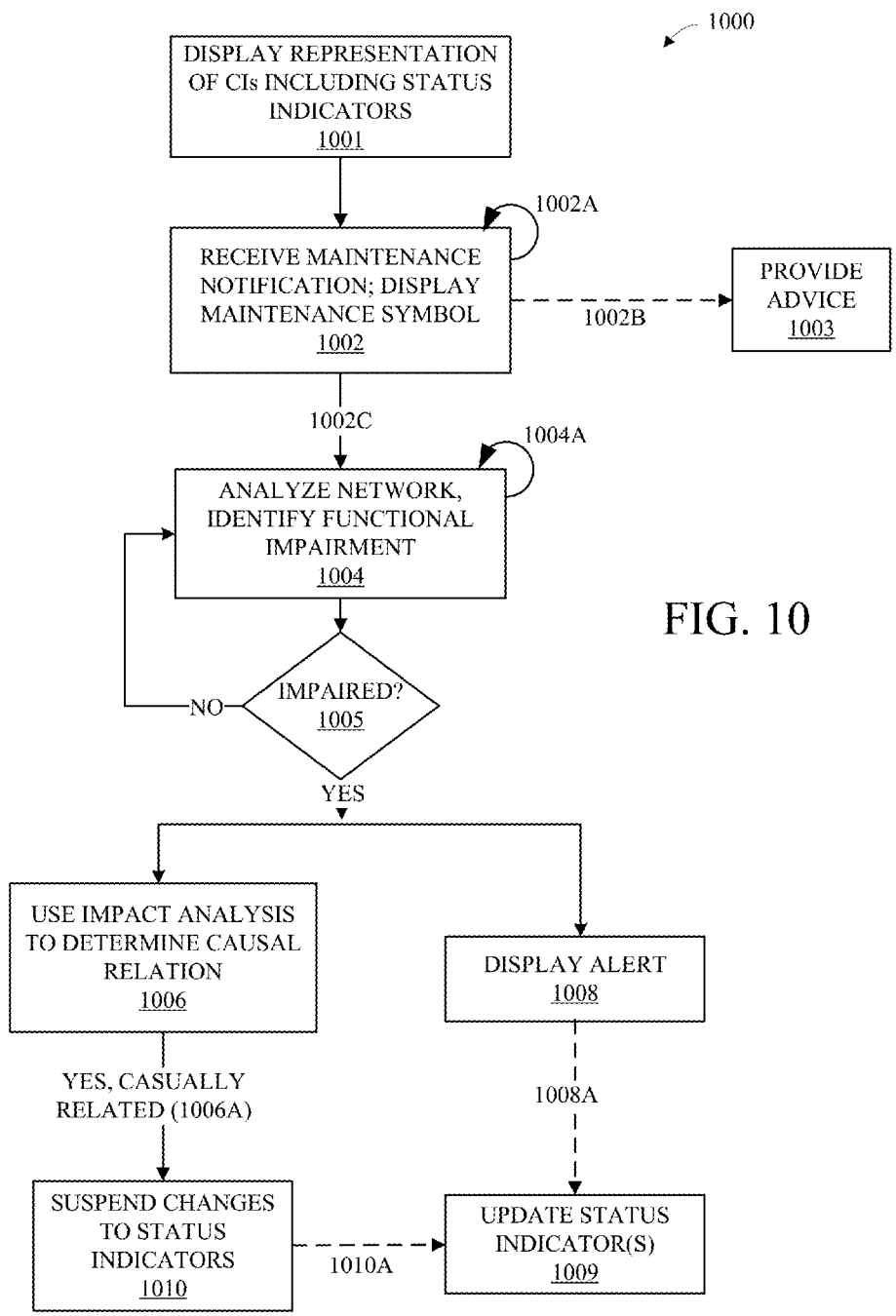
FIG. 10 is a flowchart showing an example computer-implemented process.

FIG. 10 is a flowchart showing an example computer-implemented process, which is described below in conjunction with FIGS. 6-9, which are example screen displays of illustrated outputs.

Broadly, the process 1000 is used to perform certain monitoring and analysis in a communications network. In one implementation, the process 1000 may be executed using machines and hardware such as the equipment of FIGS. 1-4 and 5A-5C. In a more particular example, the process 1000 may be performed by components of the system management module 110. An implementation can perform the process 1000, for example, by executing a machine-readable program written in JavaScript, C, or other programming language.

For ease of explanation, the process 1000 is depicted and described as a series of operations. However, operations in accordance with this disclosure may occur in various orders and/or concurrently. Additionally, operations in accordance with this disclosure may occur with other operations not presented and described herein. Furthermore, not all illustrated operations may be required to implement a method in accordance with the disclosed subject matter.

According to one implementation, operation 1001 operates in cooperation with the web server 113 to provide an output including a representation of the CIs in the network. This output includes a status indicator for each CI, showing the functional state of each CI. For example, each CI may be represented on a display by a node having a border, where each border's color, thickness, style, flashing or solid quality, or other visual feature, serves as a status indicator for the CI as per operation 1001.

Figure 6:
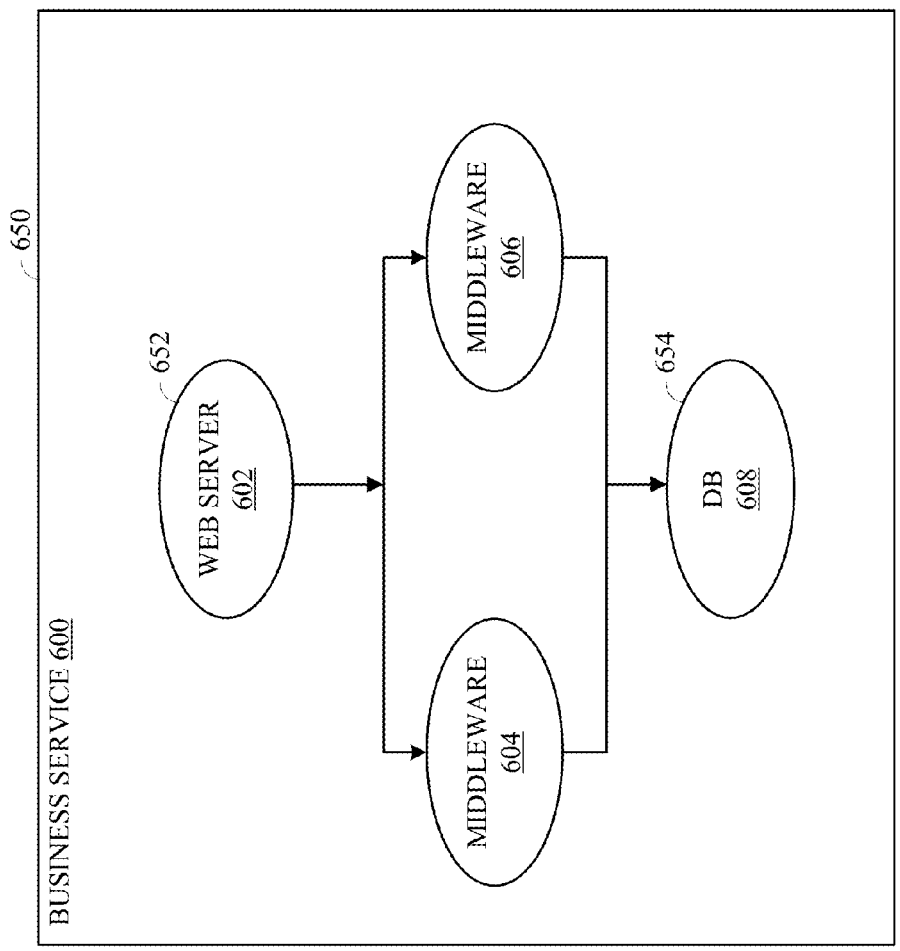
FIG. 6 is an example screen display of an illustrative output.

For example, in FIG. 6, which is an example screen display of an illustrative output, the web server display element 602 has a border 652, which is in a normal, unadorned state, since the web server 602 is not functionally impaired. Similarly, in the illustrated state, the business service 600 is not functionally impaired, and the border 650 is in its normal, unadorned state. Also, the database 608 is not functionally impaired, so the border 654 is in its normal, unadorned state.

Operation 1001 may be performed by the system management module 310, or by a third party component separate from the module 310, such as by using one or more event monitoring or console products that are commercially available in the marketplace.

In operation 1002, the change management unit 317 receives notification of planned maintenance operations defined for specific resources of the communications network. For example, a planned maintenance operation may result in resources such as a switch, router, server, and the like having reduced or no capacity. Planned maintenance also encompasses system changes such as adding, removing, reconfiguring, or modifying system resources. The resources include hardware components of the communications system 100 and services provided by the communications system 100. Some examples of hardware resources include a switch, router, server, modem, processor, I/O interface, memory, power supply, biometric reader, media reader, and the like. Some examples of services include software and firmware processes, including high level business services, executed by the hardware resources. Resources may also include computing features such as documents, models, plans, sockets, virtual machines, etc.

In one embodiment, planned changes are defined by a client/user interacting with the change management unit 317, which allows the client/user to select one or more of the CIs in the CMDB 314, define in words the type of changes planned, and the dates in which the change will be done. A change request may undergo various stages until it is approved and executed. Planned changes may also be defined in other ways, such as via automatic remediation processes executing in or in conjunction with system management module 310. A change request may or may not be effective until one or more authorized persons have approved the change. Whether or not or how a change request must be approved may vary depending on, for example, the potential impact or effect of the change.

Figure 7:
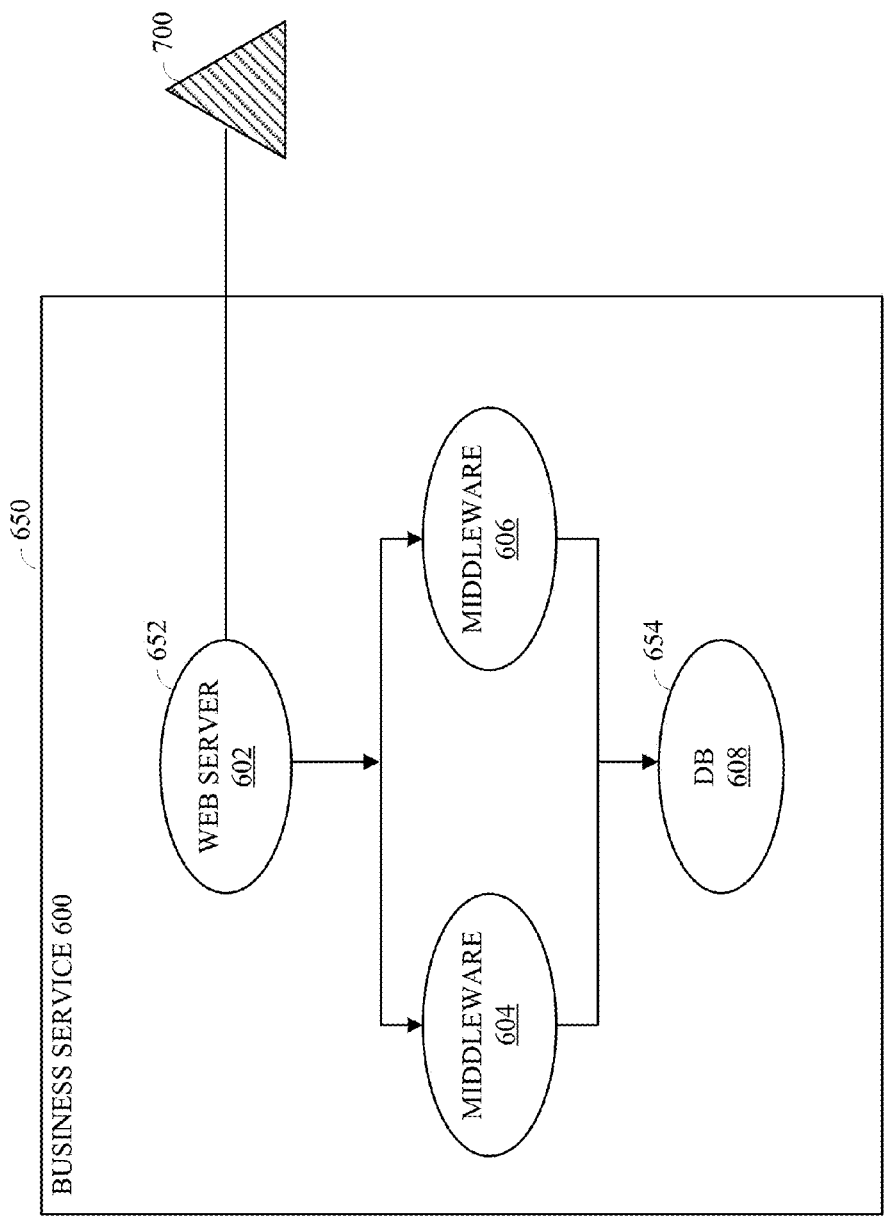
FIG. 7 is an example screen display of an illustrative output.
Figure 8:
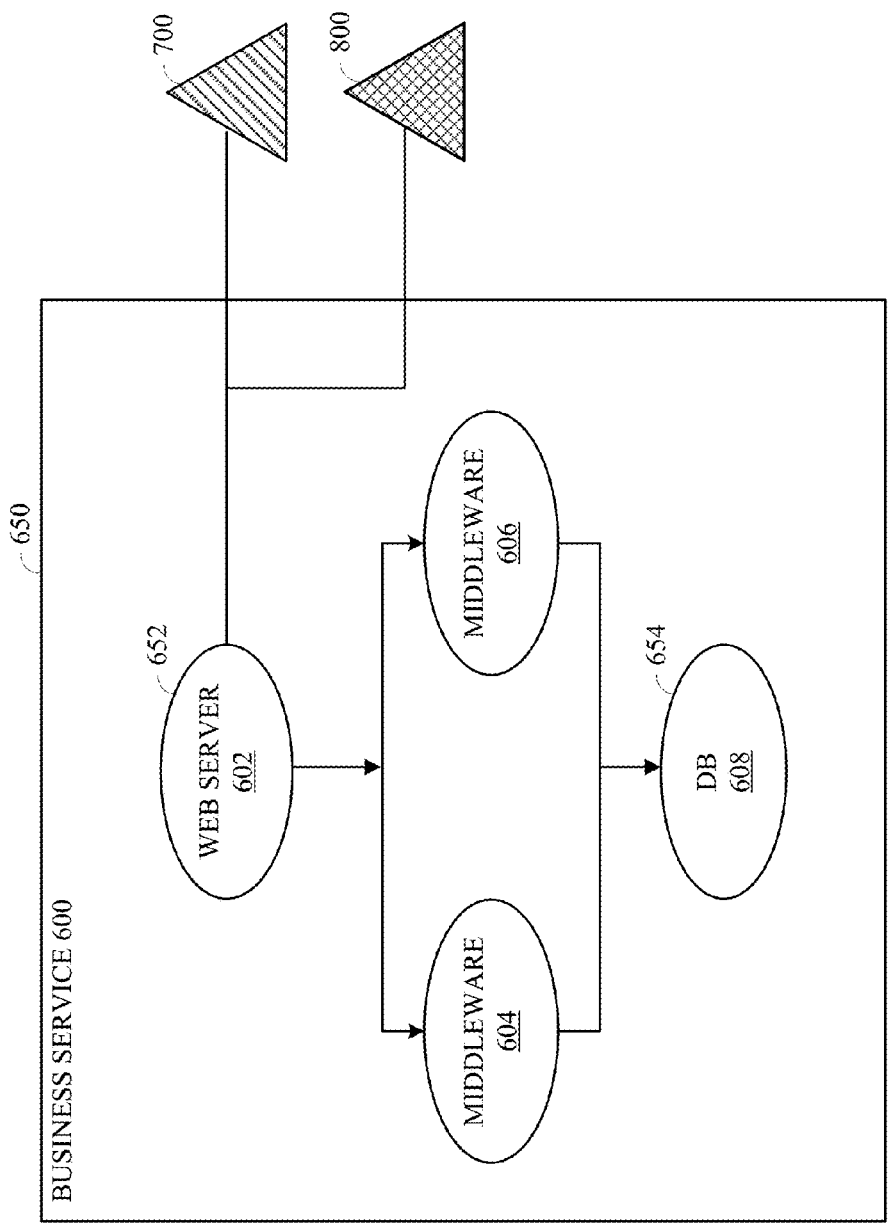
FIG. 8 is an example screen display of an illustrative output.

In one implementation, operation 1002 additionally includes the operation whereby the change management unit 317 directs the web server 313 to provide an output including a maintenance symbol for display at one or more client/user computers. The maintenance symbol is a predefined symbol added to the output display of operation 1001, where the maintenance symbol corresponds to, or represents, each CI for which a planned maintenance operation was received in operation 1002. An example maintenance symbol 700 is shown in FIG. 7. In this example, the maintenance symbol 700 is a graphic icon connected to a separate status indicator 652 that represents the CI being subjected to planned maintenance. The status indicator is different than the maintenance symbol, and is an icon or symbol representing the CI, where the visual features of the status indicator change to signify the functional status of the CI. These features are discussed in more detail below.

As indicated by the loop 1002A, operation 1002 may be repeated continually, periodically, or according to another regular or irregular schedule or event driven basis. After operation 1002, an optional operation 1003 may be performed, as indicated by arrow 1002B. Broadly, in operation 1003 the module 310 advises the client/user, when initiating a change or planned maintenance, which CIs and services might me impacted based on a historical analysis of previous similar changes performed upon the same or similar CIs and services. In other words, the tool 319 in operation 1003 provides advice to the client/user that entered the maintenance notification, where such advice concerns instances of future functional impairment likely to occur as a consequence of the newly planned maintenance operation. Operation 1003 may relay the advice to the appropriate client/user by causing the web server 313 to provide text and/or graphical notification. The advice of operation 1003 is prepared by consulting stored records (described below) representing past planned maintenance operations and also consulting stored records (described below) of functional impairment of network resources found to be causally related to planned maintenance operations in the past.

In addition to triggering the optional operation 1003, operation 1002 also triggers the performance of operation 1004 as shown by arrow 1002C. In operation 1004, the monitoring unit 318 analyzes the state of the network resources, which includes an act of identifying resources experiencing complete or partial functional impairment. In one embodiment, operation 1004 may be conducted without any awareness of planned or unplanned changes that have been received at the change management unit 317. Impairment may be defined in various ways to suit the intended application, but some examples include decisions based on features such as some or all of: component failure, slow response time, impaired availability, substandard consistency metrics, substandard reliability metrics, reduced bandwidth, status request failures, substandard route analytics, excessive memory usage, substandard CPU performance, poor network performance, low disk space availability, failed processes, certain HTTP return codes, certain SNMP traps, certain traffic flow volume or patterns, etc.

Network analysis may be performed by studying events reported by various components in the system and/or querying resources directly. The unit 318 itself may carry out network analysis, or alternatively, the unit 318 may incorporate or communicate with a third party product, in which case functional impairment is defined according to such product.

Operation 1004 stores records containing details of any instances of functionally impaired network resources, for example, in the storage 316. As shown by the arrow 1004A, operation 1004 may be repeated continually, periodically, or according to another regular or irregular schedule or event driven basis.

After operation 1004, the monitoring unit 318 in operation 1005 asks if operation 1004 found any functionally impaired CIs. If not, operation 1005 returns to operation 1004. If so, however, operation 1005 proceeds to operations 1006 and 1008. In operation 1008, the alert and status tool 320 directs the web server 313 to provide an output of alerts for display at one or more client/user computers. The alerts are predefined notifications of the functional impairments found in operation 1004. In one example, the alerts of operation 1008 may be issued upon request from an authenticated client/user computer coupled to the system 100.

An example of an alert is shown by 900 in FIG. 9. In this example, the alert 900 is a graphic icon connected to the relevant status indicator 654', representing the CI that is the subject of the alert. FIG. 9 is discussed in greater detail below.

After displaying the alert in operation 1008, the alert and status tool 320 in operation 1009 directs the web server 313 to display or alter the status indicator in accordance with the functional impairment of the relevant CI. In the case of the CI 608 and unadorned status indicator 654 (FIGS. 6-8), operation 1009 enhances the status indicator as shown by 654' (FIG. 9) to indicate a functionally impaired CI.

The progression of operation 1008 directly to operation 1009 via arrow 1008A illustrates that the tool 320 may be configured to update status indicators without any awareness of planned or unplanned changes that have been received at the change management unit 317. In this regard, operation 1009 may be performed before or concurrently with operation 1008. In a different implementation, the tool 320 may delay performance of operation 1009 until receiving a message from the impact analysis tool 319 indicating whether the changes to the relevant status indicator should be suspended (as discussed below). The features of FIG. 9 are also more fully explained below.

As mentioned above, operation 1006 also follows operation 1004. However, operation 1006, in one implementation, is only triggered if the monitoring unit 318 (in operation 1005) finds functional impairment in one or more network resources. In this event, and only for each resource experiencing complete or partial functional impairment, the impact analysis tool 319 in operation 1006 applies a predetermined impact analysis framework to determine whether the functional impairment is causally related or causally unrelated to any of planned maintenance operations received at operation 1002. For example, if a server is down but the system has received notification of a planned maintenance operation including planned downtime for the server, then there is a causal relationship. Also in operation 1006, the tool 319 stores records containing details of the results from its impact analysis, for example, using the storage 316.

Operation 1006 may be performed by analysis of CI dependencies, aggregation of events, machine learning, historical analysis, another approach, or a combination of these. In one example, operation 1006 is event-type agnostic, focusing instead on characteristics such as event severity, topology, CI type, etc. Operation 1006 is performed by systematically traversing all dependencies, whether targeted or not, in order to determine causality. Such dependencies may include, for example, network, network domain, host domain, storage, etc. In an implementation, operation 1006 may just examine whether or not a planned change exists for a CI for which a functional impairment is detected to determine that a causal relation exists. However, in other implementations, operation 1006 may include operations for detecting that specific characteristics of the functional impairment are related to the planned change (e.g., if the planned change is to replace a power supply, a functional impairment relating to low disk space might be determined to not be causally related).

If operation 1006 finds a causal relation (1006A), then the impact analysis tool 319 takes further action in operation 1010. Namely, operation 1010 acts to suspend the display of any status indicator updates corresponding to the resources whose functional impairment was found to be causally related (1006A) to the planned maintenance operations. Thus, the tool 319 takes into account planned and unplanned changes when calculating CI status using the impact analysis algorithm. In one example, this is achieved by the tool 319 communicating with the alert and status tool 320 to condition, alter, disable, prevent, or otherwise modify the status indicator update that would otherwise be displayed in operation 1009.

As shown by operation 1009 and discussed previously, the alert and status tool 320 in one example is unaware of planned or unplanned changes and the tool 320 continues to report status indicator updates whenever the related monitors fail, regardless if this is due to a planned or unplanned change. In one example, the tool 320 may act to delay status indicator updates displayed in operation 1009 until receiving input from the impact analysis tool 319, or in an alternative, the tool 319 may act to remove, withdraw, disable, or otherwise modify status indicator updates that have already been issued. In this regard, an arrow 1010A is shown between operations 1010 and 1009 to show the related and optional interplay.

After operations 1010 and 1009 complete, the process 1000 ends. However, there may be a continuing stream of maintenance notifications 1002, as shown by arrow 1002A. Furthermore, network analysis 1004 is conducted on a repeating basis as shown by arrow 1004A. These result, in any case, in frequent repeating and subsequent performance of operations 1006, 1008, and 1010 as needed.

FIGS. 6-9 are explained in greater detail below, with certain aspects repeated. An excerpt 600 of the service model corresponding to an example business service is depicted in FIG. 6. The service model excerpt 600 represents all CIs in the system 100 that correspond to this example business service. Reference 600 will be used to interchangeably refer to the aforementioned business service and the excerpt of the service model.

Apart from the process 1000, which serves to receive notification of planned maintenance and analyze the system 100 as described above, the components of the business service 600 have been entered into the CMDB 314 using one or more of the automated and/or manual discovery tools (not shown) of the system management module 310. As creating and updating the service model and its subcomponents is an ongoing process, the illustrated business 600 may be established or enhanced before, during, and/or after the process 1000 is initiated. The model excerpt 600 specifies the CIs of the related business service, as well as the relations and dependencies between them.

In the illustrated example, the business service 600 represents the following CIs. An Apache Software Foundation™ web server 602 is linked to a pair of IBM Websphere™ application and integration middleware module display elements 604-606. The modules 604-606 are linked to an ORACLE™ database display element 608.

In accordance with operation 1001, the web server 313 provides an output for display at client/user computers in the system 100, where this output includes a graphical and/or textual depiction of the components of FIG. 6. In this example, borders are illustrated around the components 602-608 and a border around as the business service 600, where each border's color, thickness, style, flashing or solid quality, or other visual feature serves as a status indicator for the CI as per operations 1009-1010. For example, the web server display element 602 has a border 652, which is in a normal, unadorned state since the web server 602 is not functionally impaired. Similarly, in the illustrated state, the business service 600 is not functionally impaired, and the border 650 is in its normal, unadorned state. Also, the database 608 is not functionally impaired, so the border 653 is in its normal, unadorned state.

The service model excerpt 600, as well as the service model 315 at large, may contain dependency relationships among some CIs. In the current example, the proper functioning of "relatively higher" CIs (such as 602), illustrated closer to the top-of-page, depends upon the functionality of "relatively lower" CIs (such as 604-606 and 608), illustrated nearer to the bottom-of-page. The relatively lower CIs operate independently of relatively higher CIs. For example, if the web server 602 fails, the database 608 will continue to operate unaffected. In the illustrated example, the presence and nature of dependency is illustrated by links, such as links 650-652 between server 602 and database 608, along with one CI being shown above or below another. The foregoing manner of illustration is merely for explanatory purposes, as a different graphical depiction may be used in one case, or the presence and dependency relations of CIs may be illustrated non-graphically in text, or code, or other symbology.

In operation 1002, a client/user notifies the change management unit 317 of a planned maintenance operation involving the web server 602. The client/user's submittal attached an indication of the maintenance operation to the CI bound to the web server 602. Consequently, as illustrated in FIG. 7, the change management unit 317 in operation 1002 provides, via the web server 313, an output depicting a maintenance symbol 700 associated with the web server 602. At this point, the borders 650, 652, 654 are unchanged, as the business service 600, web server 652, and database 608 are not functionally impaired. However, in an alternative implementation, an indication may be made for web server 602 that a planned change exists, such as by modifying border 652 to indicate that while web server 602 is not currently functionally impaired, a planned change exists.

In operation 1004, the monitoring and alert unit 318 analyzes the system 100 and identifies any functional impairments. In the illustrated example, the unit 318 has received one or more incoming messages from various monitoring systems, bound to the CI of the web server 602. These messages indicate that the web server 602 is functionally impaired. Thus, operation 1005 is satisfied since functional impairment was found.

Accordingly, in operation 1008, the unit 318 instructs the web server 313 to display an alert 1008 for each of the functional impairments that are found. The alert is exemplified by the icon 800 in FIG. 8, which is associated with the functionally impaired component 602. The status indicator 652 may also require updating, in accordance with operation 1009, since the relevant CI 602 is functionally impaired. However, the impact analysis tool 319 finds in operation 1006 that the planned maintenance operation logged for this CI is causally related to the functional impairment, so the impact analysis tool 319 in operation 1010 instructs the web server 313 to suspend any updates to the status indicator. Thus, the tool 319 suspends any changes to the border 652 of the web server 602 and the business service 600 since the functional impairment is explained by the planned maintenance operation, as found in operation 1006. In an alternative implementation, instead of suspending updates, border 652 of the web server 602 may be updated to show that a planned change is in progress that is causing a functional impairment. In this way, an operator using the system will be informed both of the functional impairment and the lack of a need for addressing the functional impairment. In addition, updates to border 650 may either be suspended to reflect a normal operating state or modified to indicate that a functional impairment exists that is the result of a planned change.

As shown in FIG. 9, if the database 608 is also found (operation 1004) to be functionally impaired, then operation 1008 displays the alert 900. Moreover, operations 1009/1010 ensure that the border 902 of the affected CI 608 and the border 650' of the affected business service 600 are changed in order to depict the functional impairment of these components, which cannot be explained by any known maintenance operations. In other words, for alerts that are bound to CIs that are not associated with any planned change, the impact calculation is done normally, thus changing the CI and service indicators.

All or a portion of aspects of the invention described herein can be implemented using a general purpose computer/processor with a computer program that, when executed, carries out any of the respective techniques, algorithms and/or instructions described herein. In addition, or alternatively, for example, a special purpose computer/processor can be utilized which can contain specialized hardware for carrying out any of the techniques, algorithms, or instructions described herein.

The implementations of computing devices as described herein (and the algorithms, methods, instructions, etc., stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination.

For example, one or more computing devices can include an ASIC or programmable logic array such as a field-programmable gate array (FPGA) configured as a special-purpose processor to perform one or more of the operations or operations described or claimed herein. An example FPGA can include a collection of logic blocks and random access memory (RAM) blocks that can be individually configured and/or configurably interconnected in order to cause the FPGA to perform certain functions. Certain FPGA's may contain other general or special purpose blocks as well. An example FPGA can be programmed based on a hardware definition language (HDL) design, such as VHSIC Hardware Description Language or Verilog.

The aspects herein may be described in terms of functional block components and various processing operations. Such functional blocks may be realized by any number of hardware and/or software components that perform the specified functions. For example, the described aspects may employ various integrated circuit components, e.g., memory elements, processing elements, logic elements, look-up tables, and the like, which may carry out a variety of functions under the control of one or more microprocessors or other control devices. Similarly, where the elements of the described aspects are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the aspects of the invention could employ any number of conventional techniques for electronics configuration, signal processing and/or control, data processing and the like. The words "mechanism" and "element" are used broadly and are not limited to mechanical or physical embodiments or aspects, but can include software routines in conjunction with processors, etc.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or a semiconductor device. Other suitable mediums are also available. Such computer-usable or computer-readable media can be referred to as non-transitory memory or media, and may include RAM or other volatile memory or storage devices that may change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

Any of the individual or combined functions described herein as being performed as examples of the invention may be implemented using machine readable instructions in the form of code for operation of any or any combination of the aforementioned computational hardware. Computational code may be implemented in the form of one or more modules by which individual or combined functions can be performed as a computational tool, the input and output data of each module being passed to/from one or more further module during operation of the methods and systems described herein.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. In other words, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment, aspect, or implementation unless described as such.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent example functional relationships and/or physical or logical couplings between the various elements. Many alternative or additional functional relationships, physical connections or logical connections may be present in a practical device. Moreover, no item or component is essential to the practice of the invention unless the element is specifically described as "essential" or "critical".

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the invention (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the operations of all methods described herein are performable in any suitable order unless otherwise indicated herein or otherwise clearly contradicted by context. The use of any and all examples, or example language (e.g., "such as") provided herein, is intended merely to better illuminate the invention and does not pose a limitation on the scope of the invention unless otherwise claimed.

All references, including publications, patent applications, and patents, cited herein are hereby incorporated by reference to the same extent as if each reference were individually and specifically indicated as incorporated by reference and were set forth in its entirety herein.

The above-described aspects have been described in order to allow easy understanding of the present invention and do not limit the present invention. To the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:
1. A computer-implemented network diagnostics system, comprising:
 a communications network;
 network accessible storage comprising a network interface and a non-volatile storage medium;

a web server coupled to the communications network, the web server comprising a processor that is programmed to relay selected information for display by client computers coupled to the network; and a system management module, coupled to the communications network and the network accessible storage via a network interface of the system management module, the system management module comprising:
a digital data processor;
program storage coupled to the digital data processor; and
one or more network links coupled to the digital data processor to relay data between the digital data processor and the communications network;
wherein the digital data processor is programmed to perform computer-implemented impact analysis tasks according to machine-readable instructions contained in the program storage that:
direct the web server to provide for display at one of the client computers an output comprising a predefined status indicator for each of a plurality of client resources of the communications network, each status indicator representing a functional state of a corresponding item of the client resources, wherein the client resources comprise hardware components of the communications network and services provided by said hardware components;
receive, from one or more of the plurality of client resources of the communications network, notification of one or more planned maintenance operations defined for specific items of the client resources;
analyze a state of the resources of the communications network to identify resources experiencing complete or partial functional impairment;
direct the web server to provide for display at one or more client computers an output comprising an update to the predefined status indicator of each of the functionally impaired resources;
perform, for each resource experiencing complete or partial functional impairment, tasks that:
apply a predetermined impact analysis framework to determine whether the functional impairment is causally related to the planned maintenance operations;
causing the direct of the web server to modify or suspend updating of the predefined status indicators of the resources whose functional impairment is causally related to the planned maintenance operations.

2. The system of claim 1, wherein the digital data processor is further programmed such that the task of directing the web server to provide for display at one or more client computers an output comprising one or more status indicators corresponding to each of the functionally impaired resources to:
direct the web server to provide for display an output displaying a block diagram depicting the resources; and
direct the web server to alter color, border, or other appearance of the depiction of each of the resources experiencing a partial or complete functional impairment determined to be causally unrelated to the planned maintenance operations.

3. The system of claim 2, wherein the digital data processor is further programmed to perform additional tasks to:

display, for each of the functionally impaired resources regardless of whether the functional impairment is causally related to the planned maintenance operations, one of multiple predefined alert icons in visual association with the functionally impaired resource, the predefined alert icons being different in appearance than the predefined status indicators and the predefined alert icons.

4. The system of claim 2, wherein the digital data processor is further programmed to perform additional tasks to:
display, for each of the resources for which notification has been received of planned maintenance operations, a maintenance symbol visually associated with said resource, the maintenance symbol being different in appearance than the predefined status indicators and the predefined alert icons.

5. The system of claim 1, wherein:
the resources are represented as configuration items (CIs) in a configuration management database (CMDB); and
the digital data processor is programmed such each planned maintenance operation is defined for one or more specific CIs.

6. The system of claim 5, wherein:
each of the CIs comprises a CI relationship with an other of the CIs;
at least some of the CI relationships comprise a dependency relationship;
the collection of CIs and relationships constitute a service model; and
the applying of the predetermined impact analysis framework comprises traversing the service model to determine whether instances of the functional impairment are causally related to the planned maintenance operations.

7. The system of claim 1, wherein:
the web server is programmed to display at the client computers an output comprising nodes representing the resources; and
the digital data processor is programmed such that the predefined status indicators comprise predefined color coding of the displayed nodes representing the resources whose functional impairment is causally related to the planned maintenance operations.

8. The system of claim 1, wherein:
the digital data processor is programmed such that the causing of the directing to suspend display of the predefined status indicators corresponding to the resources whose functional impairment is causally related to the planned maintenance operations comprises instructions that:
suspend status indicators corresponding to resources whose functional impairment is directly caused by the planned maintenance operations; and
avoiding suspension of status indicators corresponding to services that rely on underlying resources whose functional impairment is directly caused by the planned maintenance operations.

9. The system of claim 1, the network comprising:
a computer-driven change management component programmed to direct the web server to provide a graphical client interface to receive client data comprising:
definitions of planned maintenance operations;
identification of specific resources in the network associated with the defined planned maintenance operations; and
specification of maintenance time periods applicable to the defined planned maintenance operations.

10. The system of claim 1, wherein the digital data processor is further programmed to:
   store records representing planned maintenance operations;
   store records of functional impairment of resources determined to be causally related to a planned maintenance operation by the operation of applying the predetermined impact analysis framework;
   use the records responsive to receiving advance notification of a new planned maintenance operation defined for a specific resource of the network, to predict instances of future functional impairment likely to occur as a consequence of the new planned maintenance operation; and
   cause the web server to provide notification to a client computer of the predicted instances of functional impairment.

11. The system of claim 1, wherein the digital data processor is further programmed to:
   receive, from an other client computer coupled to the communications network, instructions defining a filtering scheme; and
   suspend additional status indicators in accordance with the defined filtering scheme.

12. The system of claim 1, further comprising a plurality of client computers coupled to the communications network.

13. The system of claim 1, wherein the analyzing of the state of the resources of the communications network comprises analyzing occurrences and messages signifying conditions of the resources.

14. A computer-implemented network diagnostics method for use in a communications network that comprises network accessible storage, a web server coupled to the communications network, the web server programmed to relay selected information for display by client computers coupled to the network, and a data monitoring and analysis machine, coupled to the communications network and the network accessible storage and comprising at least one digital data processor, program storage coupled to the digital data processor, and one or more network links coupled to the digital data processor to relay data between the digital data processor and the communications network, the method comprising tasks performed by the digital data processor executing machine readable instructions stored in the program storage and comprising:
   directing the web server to provide for display at one of the client computers an output comprising a predefined status indicator for each of a plurality of client resources of the communications network, each status indicator representing a functional state of a corresponding item of the client resources, wherein the client resources comprise hardware components of the communications network and services provided by said hardware components;
   receiving, from one or more client computers coupled to the communications network, notification of planned maintenance operations defined for specific items of the client resources;
   analyzing a state of the resources of the communications network including identifying resources experiencing complete or partial functional impairment;
   directing the web server to provide for display at one or more client computers an output comprising an update to the predefined status indicator of each of the functionally impaired resources;
   performing, for each resource experiencing complete or partial functional impairment, tasks comprising:
      applying a predetermined impact analysis framework to determine whether the functional impairment is causally related or causally unrelated to any of planned maintenance operations;
      causing the directing task to suspend updating of the predefined status indicators of any of the resources whose functional impairment is causally related to the planned maintenance operations.

15. The method of claim 14, wherein:
the causing of the directing to suspend display of the predefined status indicators corresponding to the resources whose functional impairment is causally related to the planned maintenance operations comprises:
   suspending status indicators corresponding to resources whose functional impairment is directly caused by the planned maintenance operations; and
   avoiding suspension of status indicators corresponding to services that rely on underlying resources whose functional impairment is directly caused by the planned maintenance operations.

16. The method of claim 14, wherein:
the resources are represented as configuration items (CIs) in a configuration management database (CMDB);
the digital data processor is programmed such each planned maintenance operation is defined for one or more specific CIs;
each of the CIs comprises a CI relationship with an other of the CIs;
at least some of the CI relationships comprise a dependency relationship;
the collection of CIs and relationships constitute a service model; and
the applying of the predetermined impact analysis framework comprises traversing the service model to determine whether instances of the functional impairment are causally related to the planned maintenance operations.

17. The method of claim 14, further comprising:
storing records representing planned maintenance operations;
storing records of functional impairment of resources determined to be causally related to a planned maintenance operation by the operation of applying the predetermined impact analysis framework;
utilizing the records responsive to receiving advance notification of a new planned maintenance operation defined for a specific resource of the network, to predict instances of future functional impairment likely to occur as a consequence of the new planned maintenance operation; and
causing the web server to provide notification to a client computer of the predicted instances of functional impairment.

18. The method of claim 14, further comprising:
displaying, for each of the functionally impaired resources regardless of whether the functional impairment is causally related to the planned maintenance operations, one of multiple predefined alert icons in visual association with the functionally impaired resource, the predefined alert icons being different in appearance than the predefined status indicators and the predefined alert icons; and
displaying, for each of the resources for which notification has been received of planned maintenance operations, a maintenance symbol visually associated with said resource, the maintenance symbol being different in appearance than the predefined status indicators and the predefined alert icons.

19. The method of claim 14, further comprising:

receiving, from an other client computer coupled to the communications network, instructions defining a filtering scheme; and suspending additional status indicators in accordance with the defined filtering scheme.

20. A computer-readable media having stored thereon:

machine-readable instructions executable by one or more digital data processing machines to perform the operations of claim 14; or first machine-readable instructions executable by one or more digital data processing machines to install second machine-readable instructions executable by one or more digital data processing machines to perform the operations of claim 14.

* * * * *